US006217637B1

(12) United States Patent
Toney et al.

(10) Patent No.: US 6,217,637 B1
(45) Date of Patent: Apr. 17, 2001

(54) MULTIPLE STAGE HIGH EFFICIENCY ROTARY FILTER SYSTEM

(76) Inventors: Jerry L. Toney; Nathan E. E. Toney, both of 4450 Duncan Bridge Rd., Cleveland, GA (US) 30528; Gregory F. Ward, 11115 Rotherick Dr., Alpharetta, GA (US) 30022

( * ) Notice: Subject to any disclaimer, the term of this patent is extended or adjusted under 35 U.S.C. 154(b) by 0 days.

(21) Appl. No.: 09/265,474

(22) Filed: Mar. 10, 1999

(51) Int. Cl.[7] .......................... B01D 33/41; B01D 33/44; B01D 35/143; B01D 39/10
(52) U.S. Cl. .................. 95/277; 95/278; 95/284; 95/287; 55/283; 55/284; 55/301; 55/403; 55/406; 55/409; 55/467
(58) Field of Search .............. 55/400, 401, 403, 55/406, 408, 409, 283, 284, 301, 467; 96/397, 421; 95/278, 287, 277, 284

(56) References Cited

U.S. PATENT DOCUMENTS

| 1,649,220 | * | 11/1927 | Goodloe | 55/408 |
| 3,979,289 | * | 9/1976 | Bykowski et al. | 210/403 |
| 4,222,754 | * | 9/1980 | Horvat | 55/283 |

FOREIGN PATENT DOCUMENTS

| 2814652 | * | 10/1979 | (DE) | 55/403 |
| 55-82246 | * | 6/1980 | (JP) | 55/400 |

* cited by examiner

Primary Examiner—David A. Simmons
Assistant Examiner—Robert A. Hopkins

(57) ABSTRACT

An apparatus and method for filtration of particulate matter in fluid streams. A unique high efficiency, two element filter embodying an enclosure containing a tandem rotary disk and drum filter mounted on a common shaft is described. A method of operation including manual and computer control modes are described.

15 Claims, 3 Drawing Sheets

MULTIPLE STAGE HIGH EFFICIENCY ROTARY FILTER SYSTEM

BACKGROUND AND SUMMARY OF THE INVENTION

1. Field of the Invention

This invention relates in general to a unique two element filter embodying an enclosure containing a tandem rotary disk and drum filter, and more specifically is directed to a high efficiency, low residence time system which has both the disk filter and the drum filter in line on the same shaft. Its design permits the filtration media to be changed in less than 10 minutes for different systems or maintenance.

2. Background of the Invention

The main absorbent component of most disposable sanitary products such as diapers and sanitary napkins is the pad or core. Typically the pad is made of wood pulp that has been fiberized by a special mill, designed to handle a special absorbent grade of wood pulp. After the pulp is fiberized, it is drawn out of the mill by an air stream onto a pad former which contains a number of shaped air forming pockets with integral screens.

The screens are generally between 20 and 80 mesh. The pad is formed on the screen with its weight and density controlled by a high velocity air stream. After the pad is formed on the screen, it moves through a process that applies the requisite components to create the complete absorbent product. Proper pad weight and density are extremely important to the disposable sanitary product manufacturer.

Exhaust air from the forming screen contains small amounts of fiberized fluff pulp. Experience has shown that the amount of pulp that comes through the forming screen ranges from 0.4% to 4% of the total amount of fluff that enters the forming chamber. The amount of pulp in the air flow downstream of the former can be increase dramatically when scarfing or pad top trimming is used. All of the this material must be recovered either as waste or more commonly as recycle material fed back to the pad former. It is especially important that it does not enter the ambient atmosphere so as to not violate EPA standards. Also the current prevalence of superabsorbent polymers (SAP) added to the pads can create a health hazard if present in the plant air. Economics are also an important spur to recycling all recovered pulp and SAP.

A number of filters are commercially available for filtering the pulp and SAP out of the pad former's exhaust air. Most of these filters have many disadvantages compared to the instant invention. These disadvantages include high cost limited versatility in terms of materials filtered, complicate internal construction, need for frequent maintenance shutdowns, difficulty in handling super absorbent polymer (SAP) fractions and difficulties in adapting to recycle operation. The last two problems are especially important in the large market of disposable diapers where the fluff pulp that is returned to the process represents a substantial cost savings to the manufacturer.

If the volume of air moving through the forming chamber and its pressure are not consistent pad formation will be poor. If the air volume or pressure is changed, the pad will have different thicknesses, densities and absorbencies and will not meet the user's specifications. By assisting in moving air through the forming screen a properly built and designed filter assists in maintaining correct air volume and pressure in the total system.

The most popular variety of prior art filters use a rotary drum for supporting the filter media. A typical system would include a pulp fiberizing mill followed by the pad former which uses a subsequent suction fan to pull the pulp through the screens. The exhaust of the suction fan leads into the filter and after cleansing the air can be exhausted to atmosphere or recycled to the process. Some filters have internal systems that remove the filter cake and return it to the fiberizer or the former in a separate air stream while others bale the recovered material.

Prior art processes usually utilize one filter for one production line. Drum filters are expensive and take up a large amount of floor space in a plant. There is a need for a filter system which is compact, efficient, versatile, easily adapted to recycle service and inexpensive.

Using one drum filter or other filter configuration for two or more production lines in order to handle larger amounts of fluff has not been an adequate solution to the problem. In this case uniform air volume and pressure will not be maintained if any of the connected production lines cease to operate.

Systems which can handle the higher loads without shutdown problems are expensive and quite complex to operate and maintain.

Another problem found in the rotary drum and other filter systems is that waste pulp has a tendency to accumulate in the bottom and other parts of the filter enclosure. Gravity and dead air spots cause the waste to remain in these corner areas Further, fluff sticks to the accumulated fluff which exacerbates the problem. Frequent shutdowns are required to clean out this fluff accumulation which is expensive and undesirable.

Methods of avoiding fluff accumulation in the comers include baffles in trouble spots to increase air velocities and redirect them, providing a turbulent air stream at the bottom of the filter enclosure, and providing more than one inlet across the bottom of the enclosure in order to create an even more turbulent air flow. However, it has been found that generally these solutions do not solve the fluff accumulation problem.

Fluff accumulation can cause other problems in a filter system. The combustible fluff pulp remaining within the enclosure can act as fuel for a fire or, in some cases, an explosive mixture can be created. Manufacturers have set limits for the amount of fluff per unit volume that they consider a safe amount to be in the enclosure at a given time. This limit is referred to as the lower explosive limit or LEL. Because it is not scientifically determined, as with hydrocarbons, it varies among different manufacturers. Regardless of the limit set accumulated fluff pulp in the enclosure is a genuine safety threat.

To offset this threat some filter manufacturers may provide rupture disks in their equipment to prevent any possible explosions in a rotary drum enclosure from spreading to other parts of a plant. The rupture disk opens when a predetermined pressure or explosive pressure is built up within the enclosure and vents it through a high pressure duct to the outside of the plant. The structure and installation of the explosion vent and its duct work can often be more elaborate and more expensive than the filter. Thus, manufacturers have searched for ways to avoid having to provide explosion vents.

OBJECTS OF THE INVENTION

It is the principal object of the present invention to provide an improved filter and recycle system for the filtration of fluff pulp and SAP in the downstream air flow from a disposable product pad former which will allow:

1. Filtered exhaust air flow that is in compliance with EPA clean air standards
2. Low energy consumption
3. Extremely simple operation
4. Low capital cost
5. Low risk of fiber accumulation in the filter enclosure
6. Simple recycle system
7. Minimal space requirements
8. Can be mounted horizontally or vertically
9. Adaptable to filtration of other types of solids and fluids
10. Filter media can be changed rapidly for changes in filtration conditions
11. Easy to operate More specifically, it is an object of the invention to improve filtration operations by providing a complete system with automatically controlled operation.

A further object of the invention is to provide an improved method of operating a filter with increased capacity and efficiency at relatively low energy and capital cost and with a minimum of complexity.

Another object of the invention is to provide a filter with the capacity to handle the increased load of scarfed pulp without reduced efficiency.

Another object of the invention is to provide an improved filter for the purposes described which allows the operating conditions within the apparatus to be varied in a sufficiently wide range of relationships to accommodate the filtration of a large variety of organic and inorganic materials from an airstream without the limitations characterizing earlier and present production filtration systems.

SUMMARY OF THE INVENTION

Achieving the objects of the invention resulted in a filter system utilizing a filter assembly comprising a tubular enclosure containing at least one rotary disk and a drum filter. In order to reduce the filter system's internal volume, mechanical complexity and cost, both the disk and the drum are attached to a common shaft within the enclosure. The process air and entrained pulp is introduced into the plenum created between the end of the enclosure and the disk by a duct from the process suction fan which is between the filter and the pad former. The length of this plenum is typically between about 0.2 and 1.0 enclosure diameters. The velocity of the air mixture is reduced by the plenum but is still fast enough (about 1200 to 2000 feet per minute) to create sufficient turbulence to prevent dead spots and dropping out of the high density SAP particles or fluff but slow enough to prevent pressure plugging of the media. The disk fills the full diameter of the enclosure and is sealed at the inner wall of the enclosure with a felt seal or other rotational sealing means. The disk is composed of a circular frame over which a wire mesh screen is attached on the inlet side of the disk. The mesh sizes may vary from about 10 to 100 or more with about 40 to 60 mesh being satisfactory for primary pulp recovery. In some case it may be preferable to utilize a woven or needle punched fabric covering over the mesh. A vacuum arm or other means of vacuuming the surface of the filter media extends over the surface of the disk. As the disk rotates the vacuum produced by the suction of a variable speed fan removes the pulp and SAP or other particulate and returns it to the pad former.

The efficiency of the disk filtration step is enhanced by several control methods. First, the disk rotational speed may be increased in response to an increase in differential pressure across the disk filtration media. Secondly the level of vacuum may be increased by increasing the rotational speed of the variable speed recycle suction fan and thirdly, both the disk speed and the vacuum level may be increased simultaneously.

The vacuum means may be operated at a fixed distance from the media or it may be in contact with the media by use of a sealing means around the periphery of the vacuum means. This can be a felt or bristle system which prevents admitting of ambient air within the chamber but does not abrade the media surface. Naturally the fourth efficiency variable in the system is the correct choice of media.

The rotary disk is detachably connected to the shaft by a connection means such as a key, keyway and nut combination and or other means, such as a spline, to prevent the disk from slipping on the shaft. After disconnection, the disk is easily removable through the first enclosure access door in order to replace media.

It is contemplated that more than one disk screen, vacuum arm, and suction manifold may be used for complex mixtures especially other than pulp filtration systems. It is clear that use of a gradient of screen mesh sizes would provide increased capacity as well as the ability to grade the filtered material by providing individual vacuum and collector systems for each particulate size range.

The drum segment of the filter is located downstream of the disk between about 0.1 and 1.5 diameters of the disk and is mounted on the common shaft. Its purpose is to remove the residual particulate matter not removed by the disk screen. The drum's diameter is less than the inside diameter of the tubular enclosure and may vary from 0.3 to 0.9 inside drum diameters. The actual design drum diameter and drum length is determined by the desired plenum velocity and the required filtration surface area for the type and amount of particulate to be removed. The drum is composed of a tubular frame around which a perforated plate is attached to provide support for the filter media. The upstream end facing the flow through the rotary disk is solid. Although experience has shown that no material sticks to the flat surface of the drum end, if conditions required it, a conical end cover could be used to prevent direct impingement of the airflow on the flat end of the drum. A woven or needle punched fabric is used as the media covering over the perforated outer surface of the drum. A vacuum arm or other means of vacuuming the surface of the filter media extends over the surface of the drum. As the drum rotates the vacuum produced by the suction of a variable speed fan removes the pulp and SAP or other particulate and returns it to the pad former or process. The efficiency of the drum filtration step is enhanced by several control methods. First, the disk rotational speed may be increased in response to an increase in differential pressure across the drum filtration media. Secondly the level of vacuum may be increased by increasing the rotational speed of the variable speed recycle suction fan and thirdly, both the drum speed and the vacuum level may be increased simultaneously.

Because the disk and drum are on a common shaft when the speed of one unit is decreased or increased the same happens to the other unit. This is not a problem and is controlled by a logic program in the programmable logic controller which controls the filter system and which, among other variables, controls fan speeds and the filter shaft rotational speed.

The vacuum means may be operated at a fixed distance from the media. The actual distance depends on the size and variability of the particulate mass. The vacuum means may also be in sliding contact with the media by use of a sealing means around the periphery of the vacuum means. This can be a felt or bristle system which prevents admission of ambient air within the chamber but does not abrade the media surface. The fourth efficiency variable in the system is the correct choice of media.

As will be noted from the above description it may be desirable to utilize more than one vacuum system to clean the disk and drum media. This is fully contemplated by the instant invention especially as regards multiple disks an particulate grading systems or systems with a very broad range of particulate size.

An air knife located within the drum filter next to the internal surface of the perforated covering of the drum and parallel to its axis may be employed to intermittently pulse air outward of the drum to reduce any caking or blinding of the filter media that may occur under unusual conditions.

The downstream end of the drum abuts the downstream inside end of the enclosure. A rotary seal is used to prevent contaminated process air from entering the clean air stream exiting the drum filter through a duct which leads to a variable speed balancing fan. This fan maintains a relatively constant negative pressure within the enclosure.

The variable speed drive motor for rotating the common shaft that supports the disk and the drum is located within or outside the duct depending on design requirements.

The instant invention as described above can also be used for the filtration of a wide variety of air entrained particulate matter in addition to fluff pulp. In many cases with simple modification, familiar to any one knowledgeable in the art, the system could be used for the filtration of particulate matter in water or other fluids.

Because of its compact design and other considerations the filter may mounted vertically or horizontally.

It is further contemplated that dual concentric shafts with separate rotary drive means could be used in place of the main shaft and single drive mean to drive the rotary disk and rotary drum separately in some circumstances. In this case the control system would only require minor logic programming modifications.

DETAILED DESCRIPTION OF A PREFERRED EMBODIMENT

Figure 1:
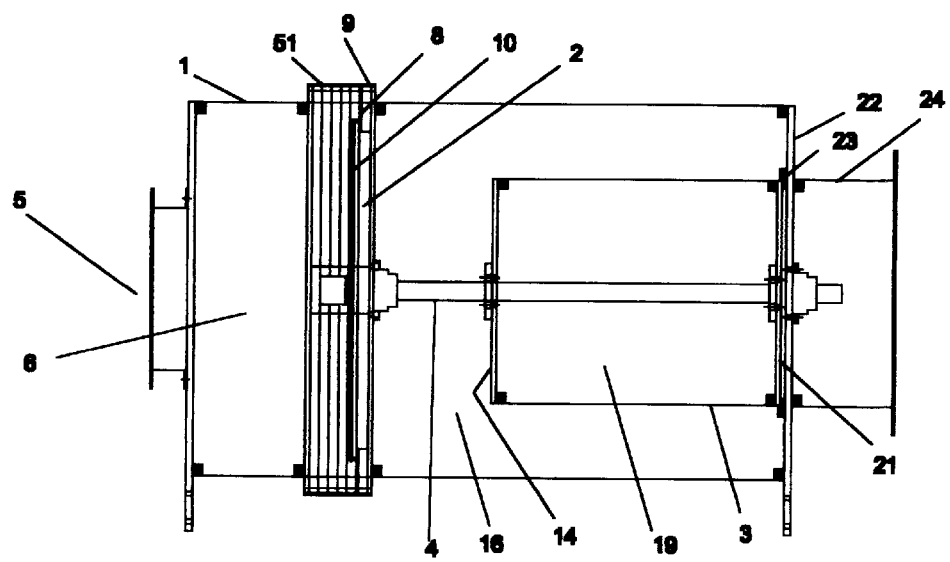
FIG. 1 shows a side view of the enclosure and its internal filter system.
Figure 4:
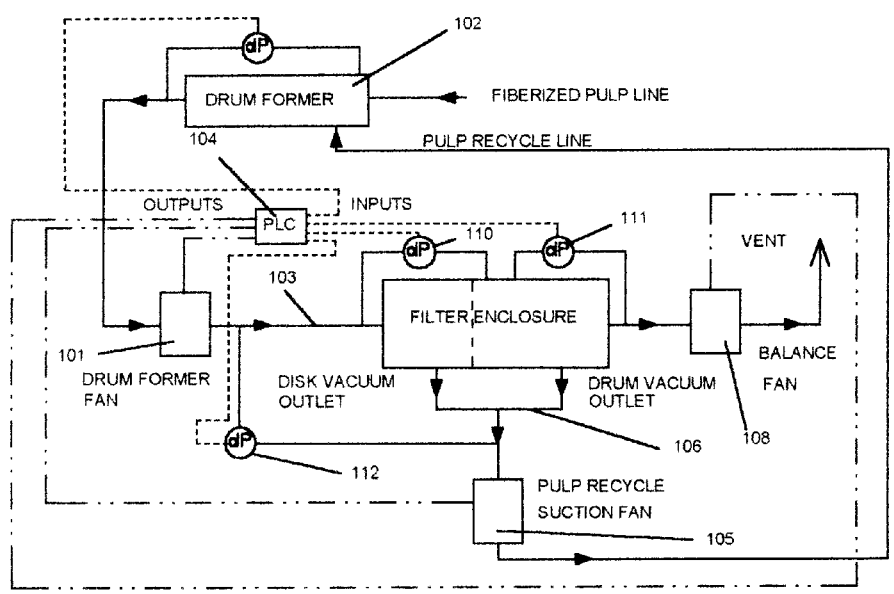
FIG. 4 is a schematic of the overall system arrangement.
Figure 5:
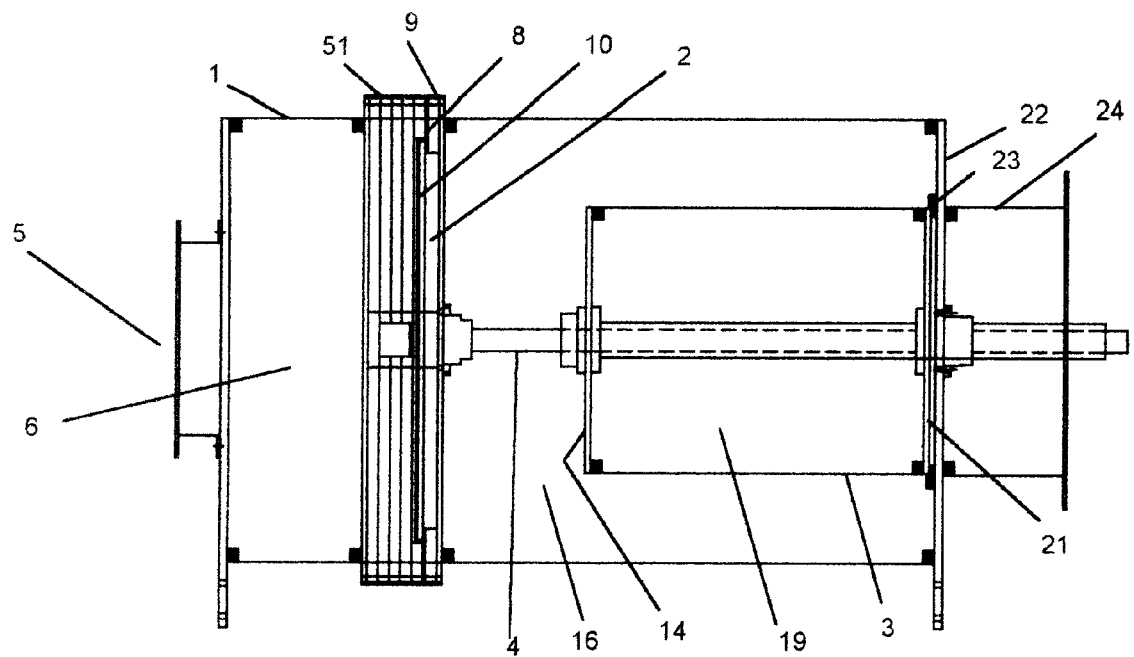
FIG. 5 is a view of the dual concentric drive shafts.

Referring to FIG. 1 discloses a filter assembly comprising a tubular filter enclosure 1 containing a rotary disk 2 and a drum filter 3 attached to a common shaft 4 within the enclosure 1. The process air and entrained pulp 5 are introduced into the primary plenum 6, created between the first end of the enclosure 7 and the rotary disk 2. As shown in FIG. 4 it enters through duct 103 from the pad former process suction fan 101 of FIG. 4. which is located between the filter and the pad former 102.

Figure 2:
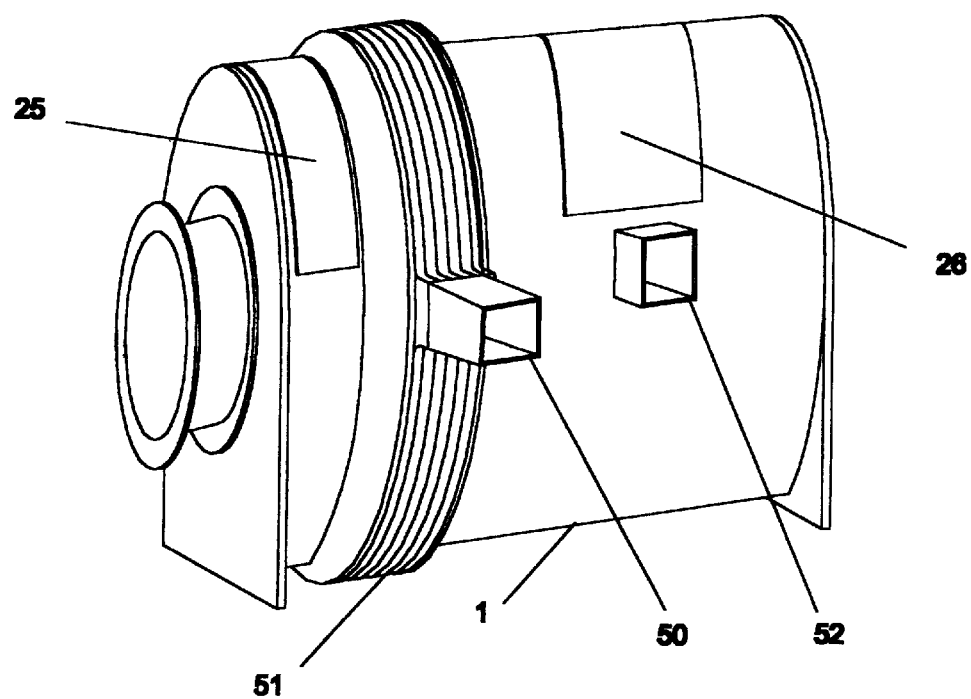
FIG. 2 is a three dimensional view of the assembled enclosure.

The rotary disk 2 extends radially from the shaft to slightly beyond the inside diameter of the sealing ring 9. A seal is formed by a felt seal 8 fixed to the down stream surface of the disk and between the disk and the sealing ring 9. While the preferred embodiment is described with reference to a seal and sealing ring it is to be understood that a variety of rotary filter disk sealing configurations may be used. The rotary disk 2 is detachably connected to the shaft by a connection means and a means to prevent the disk from slipping on the shaft. It is easily removable through the access door 25 of FIG. 2 in order to replace media.

The rotary filter disk is composed of a circular frame over which a wire mesh screen 10 of 80 mesh is attached on the inlet side of the disk. While the preferred embodiment is described with reference to a 80 mesh screen it is to be understood that a variety of screen mesh sizes may be used as referenced in the summary of the invention.

Figure 3:
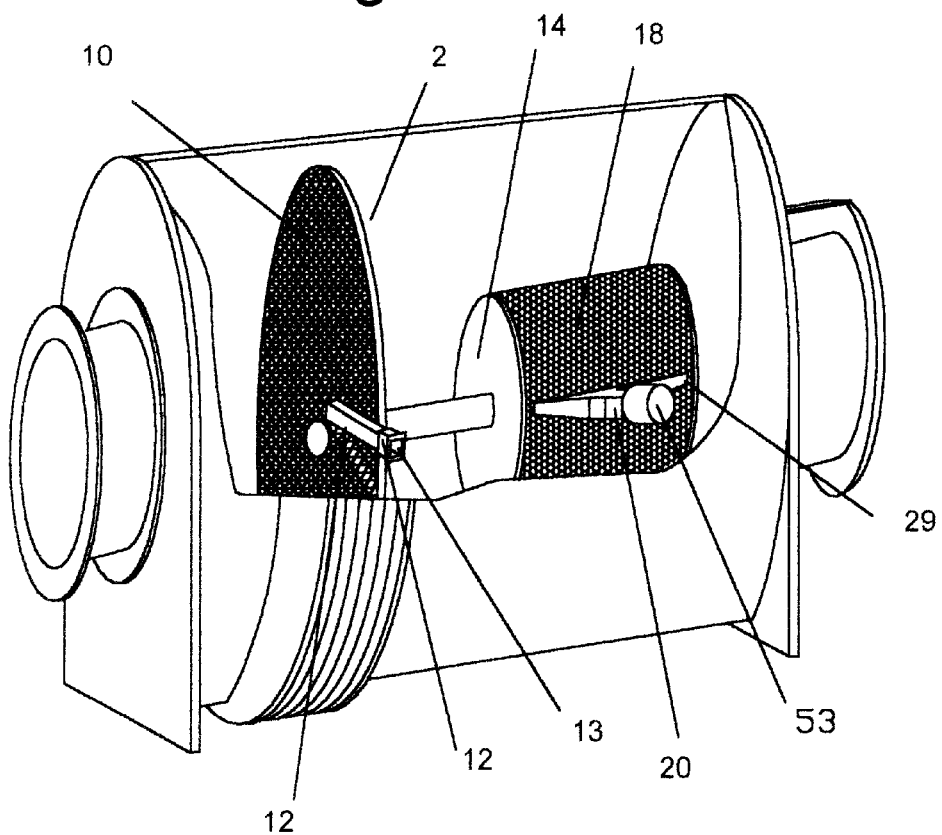
FIG. 3 is a three dimensional cutaway view of the assembled enclosure to show the relationship of the major components.

A fixed vacuum arm 12 is shown in FIG. 3 which extends perpendicular to the enclosure surface and outward over the radial surface of the disk. The inner end of the vacuum arm 13 is attached to a vacuum plenum 50, shown in FIG. 2 located in the ring assembly 51. The distance between the surface of the screen 10 and the fixed vacuum arm 12 is fixed at a distance of between about 0.010 and 0.030 inches. While the preferred embodiment is described with reference to a fixed distance it is to be understood that a variety of vacuum arm configurations and vacuum sealing means may be used as referenced in the summary of the invention. As the disk rotates a vacuum produced in the vacuum plenum 50 by the suction of a variable speed fan removes the pulp and SAP or other particulate and returns it to the pad former.

The disk rotational speed may be increased in response to an increase in differential pressure 110 across the disk filtration media or the level of vacuum may be increased by increasing the rotational speed of the variable speed recycle suction fan 105. Both the disk speed and the absolute vacuum level may be increased simultaneously.

While the preferred embodiment is described with reference to one rotary disk screen it is to be understood that more than one rotary disk screen, more than one vacuum arm and more than one vacuum plenum may be used as referenced in the summary of the invention The rotary drum 3 segment of the filter assembly shown in FIG. 1 is located downstream of the disk 2 about 0.3 disk diameters and is mounted on the common shaft 4. Its purpose is to remove the residual particulate matter not removed by the disk screen 10. The drum's diameter is 0.5 inside enclosure diameters. The actual design drum diameter and drum length is determined by the desired secondary plenum 16 velocity and the required filtration surface area for the type and amount of particulate to be removed. The drum is composed of a tubular frame around which a perforated plate 18 in FIG. 3 is attached to provide support for the filter media 19. The upstream end 14 facing the flow through the rotary disk is solid. A needle punched fabric of about 160 grams per square yard is used as the media covering over the perforated outer surface of the drum. The perforated outer surface of the drum has about 80% open area. A vacuum arm 20 as shown in FIG. 3 extends from the outer vacuum port 23 to the horizontal drum suction sweep, which extends horizontally over the full length of the horizontal surface of the drum. As the drum rotates, the vacuum produced by the suction of a variable speed fan 105 of FIG. 4 removes the pulp and SAP or other particulate and returns it to the pad former or process. The drum rotational speed is increased in response to an increase in differential pressure 111 across the drum filtration media and the level of vacuum may be increased by increasing the rotational speed of the variable speed recycle suction fan 105. The drum speed and the vacuum level can be increased simultaneously.

Because the disk and drum are on a common shaft when the speed of one unit is decreased or increased the same happens to the other unit. The schematic of FIG. 4 shows how this is controlled by a logic program in the programmable logic controller 104 which controls the filter system and which, among other variables, controls fan speeds and the filter shaft rotational speed.

Vacuum or negative pressure for extraction of particulate from the surfaces of the rotary disk and rotary drum filter media is created by the suction of a single vacuum fan 105 attached to a dual manifold 106. While the preferred embodiment is described with reference to a single fan it is to be understood that multiple vacuum fans can be used for particulate extraction as referenced in the summary of the invention.

The downstream end 21 of the drum 3, as shown in FIG. 1, abuts the downstream inside end 22 of the enclosure. A felt rotary seal 23 is used between the rotating drum and the stationary enclosure 22 to prevent contaminated process air from entering the clean air stream exiting the drum filter through the duct 24 which leads to a variable speed balancing fan 108. This fan maintains a relatively constant negative pressure within the enclosure. The variable speed balancing fan 108 may be included in the PLC control system or operated independently.

The variable speed drive motor for rotating the common shaft that supports the disk and the drum assemblies is located within the duct.

EXPERIMENTS

Experiments were run at various pad former speeds in order to evaluate the performance of the filter and its response to changing conditions with reference to meeting EPA Standards on the final exhaust air. The recycle line was temporarily located a bag filter The pad former was run for 10 minutes for each test. All filtered pulp material was collected in tared bag filters and the recycle load was calculated. The cleaned air exhaust was collected, measured and compared to EPA Standards. The data is summarized in the following table.

TABLE 1

| Experiment Data | | 1 | 2 | 3 |
| --- | --- | --- | --- | --- |
| Pad Former Output | Pads per minute | 300 | 500 | 800 |
| Pad Weight | Grams | 19 | 19 | 19 |
| Pad Former Output per 10 minute test | Grams/10 min | 57,000 | 95,000 | 152.000 |
| Recovered Pulp per 10 minute test | Grams | 2912 | 5316 | 8930 |
| Percentage of total through-put pulp | % | 0.51 | 0.56 | 0.59 |
| Pulp in exhaust air | Pass/No Pass | PASS | PASS | PASS |

We claim:

1. A filter for separating a particulate from conveying fluid, the filter comprising:

a tubular enclosure with a first duct entrance means at the first end and a second duct exit means at the second end;

at least one rotary disk extending radially from an axially centered drive shaft to a sealing means circumferentially attached to the inner wall of said tubular enclosure, and a drum filter attached to said shaft and contained within the enclosure wherein the diameter of said drum filter is less than the inside diameter of said tubular enclosure and the first end, which is solid, of said drum is located a distance from the said rotary disk and the second end of said drum filter, which has an open area for passage of air from the interior of said drum to said second duct means, and which is located at a distance from said first drum end, and wherein the circumferential exterior surface of said drum is perforated and said second end of said filter drum is open to its circumference and said circumference is rotatably sealed against the open second end of the enclosure wherein the opening is detachably connected to said second end duct;

filter media means attached to the first radial surface of said rotary disk;

filter media means attached on the outer circumferential surface of said rotary drum;

first and second duct means for said enclosure wherein the first duct means brings in a particulate and air mixture which passes through the filtration media on the first surface of the rotating disk and deposits particulate on said filtration media, wherein the air and any particulate not removed by said first filtration media flows through the said drum filter and out of the enclosure through said second duct means;

a first variable speed suction means for drawing the air from the source of particulate contamination and blowing it through said filtration media on said rotary disk and the rotary drum and out of the enclosure, the suction means capable of exhibiting a substantially constant and controllable static negative pressure;

one or more first vacuum sweep arms having a length and a width which extends horizontally from the wall of said enclosure to the support shaft of the rotary disk wherein there are as many said vacuum sweep arms as the number of said rotary disks, and said sweep arm is held at a fixed close distance from said rotary disk whereby said particulate coating said filter media is continually removed out of said sweep arm and through the outer enclosure wall via a duct by a negative pressure created by a second variable speed suction means;

one or more second vacuum sweep arms having a length and a width which extends perpendicularly from the wall of said enclosure to the axial surface of the rotary drum and is held at a fixed close radial distance to said rotary drum media whereby particulate coating said filter media is continually removed out of said sweep arm and through the outer enclosure wall via a duct by a negative pressure created by said second variable speed suction means;

a second variable speed suction means for drawing the air from said first and second vacuum sweep arms;

a third variable speed suction means located downstream of said filter wherein said suction means creates a variable negative pressure at the exhaust of said filter enclosure; and a variable speed rotational means that drives the rotary shaft.

2. The filter of claim 1 wherein a control system using a programmable logic controller is used to vary the speeds of all variable suction means and shaft rotational speed based on pressure drop information across the disk filter and the drum filter media.

3. The filter of claim 1 wherein a manual control system is used to vary the speeds of suction means and shaft rotational speeds based on pressure drop information across the disk filter and the drum filter media.

4. The rotary disk of claim 1 wherein the filter media covering said rotary disk is a needle punched fabric.

5. The first, second and third suction means of claim 1 wherein said suction means are of constant rotational speed.

6. The second suction means of claim 1 wherein individual and separate suction means are used to create negative pressure for the disk filter vacuum system and a separate suction means is used for the rotary filter vacuum system.

7. The vacuum means of claim 1 wherein said vacuum means is in sliding contact with the media by use of a sealing means around the periphery of said vacuum means.

8. The drive shaft of claim 1 wherein dual concentric shafts with separate rotary drive means are used to drive the rotary disk and rotary drum independently.

9. A method for separating and recovering particulate matter from a process conveying air stream comprising the steps of:

filtering the particulate laden air by conveying said air out of said process into a tubular enclosure, having a first duct entrance means at the first end and a second duct exit means at the second end, using a first variable speed suction means to;

firstly, drawing said particulate laden air through at least one rotary disk filter comprised of filtration media appropriately selected for maximum particulate retention and minimal pressure drop, said filter extending radially from an axially centered shaft wherein the coarser particulate matter is removed, and continuously removing said particulate from a first surface of said disk filter media using a vacuum means and returning said particulate through a third variable speed suction means to said process;

measuring the pressure drop over said rotary disk; and increasing the rotational speed of said rotary disk in response to any increase in pressure drop thereby increasing the particulate removal rate;

secondly, drawing the partially filtered air into a rotary drum filter axially mounted on said shaft, said filter having a closed first end, an open second end and wherein said filter is contained within said tubular enclosure and wherein the circumferential exterior surface of said drum filter is perforated and covered with a filter media, said filtration media having been appropriately selected for maximum particulate retention and minimal pressure drop whereby any residual particulate matter is removed from said partially filtered air, and continuously removing said particulate from said filtration media surface of said drum filter using a vacuum means and returning said particulate through said third variable speed suction means to said process; and measuring the pressure drop over said rotary drum; and increasing the rotational speed of said rotary drum in response to a predetermined increase in pressure drop thereby increasing the particulate removal rate; and thirdly, drawing clean air from said drum filter through the opening at said second duct exit means and returning it to the process or atmosphere, wherein the drawing of said clean air is assisted by a second variable speed suction means external to said filter and connected to the second duct exit means and whereby said suction means creates a variable negative pressure.

10. The method of claim 9 wherein the rotational speed of the shaft is varied in response to the pressure drop across the rotary disk.

11. The method of claim 9 wherein an air purge means is used to intermittently blow back through the filter media when a high differential pressure is sensed over said drum filter media.

12. The method of claim 9 wherein the third variable speed suction means speed is increased or decreased to provide a constant pressure drop over said rotary filter.

13. The method of claim 9 wherein the speed of said second variable speed suction means is varied in response to the increase in pressure drop over said rotary disk filter.

14. The method of claim 9 wherein the speed of said second variable speed suction means is varied in response to the increase in pressure drop over said rotary drum filter.

15. The method of claim 9 wherein a control system using a programmable logic controller is used to vary the speeds of all said variable suction means and shaft rotational speed based on pressure drop information across the disk filter and the drum filter media.

* * * * *